United States Patent
Ellison et al.

(10) Patent No.: US 7,671,311 B2
(45) Date of Patent: Mar. 2, 2010

(54) GIMBAL SYSTEM WITH AIRFLOW

(75) Inventors: Bruce Ellison, Lake Oswego, OR (US);
John L. Miller, Lake Oswego, OR (US);
Gerard A. Morelli, Beaverton, OR (US);
Bruce A. Dickerson, Tigard, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 11/357,254

(22) Filed: Feb. 17, 2006

(65) Prior Publication Data
US 2007/0194170 A1    Aug. 23, 2007

(51) Int. Cl.
*F42B 15/00* (2006.01)
*F42B 15/01* (2006.01)

(52) U.S. Cl. ............... 244/3.1; 244/3.15; 244/3.16; 74/5.34

(58) Field of Classification Search ........... 244/3.1–3.3, 244/158.1, 164, 165, 75.1, 76 R, 79; 701/200, 701/207, 220; 74/5 R, 5.34, 5.37; 123/56.4; 248/127, 176.1, 177.1, 178.1, 179.1, 181.1, 248/182.1
See application file for complete search history.

(56) References Cited

U.S. PATENT DOCUMENTS

| | | |
|---|---|---|
| 1,236,722 A | 8/1917 | Lange |
| 1,812,833 A * | 6/1931 | Schaefer .................... 123/56.4 |
| 2,552,940 A | 5/1951 | Cornut |
| 2,945,414 A | 7/1960 | Blackstone |
| 3,012,440 A | 12/1961 | Thierman |
| 3,085,354 A | 4/1963 | Rasmussen, et al. |
| 3,128,982 A | 4/1964 | Christopher |
| 3,638,502 A | 2/1972 | Leavitt et al. |
| 3,765,631 A | 10/1973 | Herbst et al. |
| 4,044,364 A | 8/1977 | Prinzo |
| 4,155,521 A * | 5/1979 | Evans et al. ................ 244/3.16 |
| 4,195,903 A | 4/1980 | Kawase et al. |
| 4,218,702 A | 8/1980 | Brocard et al. |

(Continued)

FOREIGN PATENT DOCUMENTS

WO    WO82-00515    2/1982

OTHER PUBLICATIONS

"Inertial Measurement Units"; no author listed; no date listed; posted on the Internet at spaceflight.nasa.gov; article was last updated on Apr. 7, 2002.*

(Continued)

*Primary Examiner*—Bernarr E Gregory
(74) *Attorney, Agent, or Firm*—Kolisch Hartwell, PC

(57) ABSTRACT

Systems, including apparatus and methods, for driving airflow along a surface of a gimbal. The systems may comprise a gimbal apparatus including a payload and also including a gimbal mount supporting a first gimbal and a second gimbal. The first gimbal may be coupled pivotally to the gimbal mount. The second gimbal may be coupled pivotally to and supported by the first gimbal. The second gimbal may be coupled to and may support the payload. The gimbal apparatus may orient the payload by pivotal movement of the first and second gimbals relative to the gimbal mount about at least two nonparallel axes. The system also may comprise a fan mounted to the first gimbal. The systems also may comprise operating the fan to drive airflow through a gap disposed between the first and second gimbals.

25 Claims, 2 Drawing Sheets

U.S. PATENT DOCUMENTS

| | | | |
|---|---|---|---|
| 4,249,817 A | | 2/1981 | Blau |
| 4,961,636 A | | 10/1990 | Gaul et al. |
| 4,989,466 A | | 2/1991 | Goodman |
| 5,034,759 A | | 7/1991 | Watson |
| 5,077,465 A | * | 12/1991 | Wagner et al. ............. 244/3.16 |
| 5,121,220 A | | 6/1992 | Nakamoto |
| 5,279,479 A | | 1/1994 | Adama et al. |
| 5,372,333 A | * | 12/1994 | Uwira et al. ............... 244/3.16 |
| 5,383,645 A | | 1/1995 | Pedut et al. |
| 5,515,206 A | | 5/1996 | Peng |
| 5,527,003 A | * | 6/1996 | Diesel et al. ............... 244/76 R |
| 5,528,416 A | | 6/1996 | Hartmann |
| 5,548,442 A | | 8/1996 | Devenyi et al. |
| 5,726,814 A | | 3/1998 | Lidwell |
| 5,831,762 A | | 11/1998 | Baker et al. |
| 5,897,223 A | | 4/1999 | Tritchew et al. |
| 5,907,433 A | | 5/1999 | Voigt et al. |
| 5,953,155 A | | 9/1999 | Eckel, Jr. et al. |
| 5,954,310 A | | 9/1999 | Soldo et al. |
| 5,967,458 A | * | 10/1999 | Williams et al. ........... 244/3.16 |
| 6,145,393 A | | 11/2000 | Canton |
| 6,154,317 A | | 11/2000 | Segerstrom et al. |
| 6,175,807 B1 | * | 1/2001 | Buchler et al. .............. 701/220 |
| 6,181,988 B1 | * | 1/2001 | Schneider et al. .......... 244/3.16 |
| 6,271,975 B1 | | 8/2001 | Grupp |
| 6,354,749 B1 | | 3/2002 | Pfaffenberger |
| 6,396,235 B1 | * | 5/2002 | Ellington et al. ............. 74/5.34 |
| 6,422,508 B1 | * | 7/2002 | Barnes ...................... 244/3.16 |
| 6,454,229 B1 | | 9/2002 | Voigt et al. |
| 6,708,943 B2 | | 3/2004 | Ursan et al. |
| 6,764,051 B2 | | 7/2004 | Knight |
| 7,023,615 B1 | | 4/2006 | Voigt et al. |
| 7,264,220 B2 | | 9/2007 | Dent et al. |
| 2006/0071121 A1 | | 4/2006 | Wescott et al. |
| 2006/0071134 A1 | | 4/2006 | Dent et al. |
| 2007/0086087 A1 | | 4/2007 | Dent et al. |

OTHER PUBLICATIONS

"Inertial Measurement Units"; no author listed; no date listed; posted on the Internet at nasa.gov; Curator: Kim Dismukes; Responsible NASA Official: John Ira Petty; Last Updated: Apr. 7, 2002.*

Copenheaver, Blaine R., Authorized officer, International Searching Authority, International Search Report for PCT Application No. PCT/US07/04228; search date: May 5, 2008.

* cited by examiner

US 7,671,311 B2

GIMBAL SYSTEM WITH AIRFLOW

CROSS-REFERENCES TO RELATED APPLICATIONS

The following U.S. patent applications are incorporated herein by reference: Ser. No. 10/956,738, filed Oct. 1, 2004; and Ser. No. 10/956,739, filed Oct. 1, 2004.

INTRODUCTION

Many devices, such as imaging and/or laser systems, may be mounted and used on a support platform. For example, vehicles, such as aircraft, watercraft, and ground vehicles, may provide moving support platforms capable of transporting such devices. Whether moving or stationary, these devices may benefit from being easily and accurately reoriented with respect to the support platform, for example, to be pointed at a desired target.

Gimbals may be used to mount the devices pivotably, as payloads, to support platforms. The gimbals may allow each payload to be aimed at directionally distinct targets without reorienting the support platform. To facilitate transport by a vehicle, gimbals may be designed to have a compact, aerodynamic configuration. Unfortunately, such a configuration may limit the ability of the gimbals to release heat, particularly when the vehicle is not moving, thereby resulting in overheating of sensitive payload components. This may be especially true for gimbals that contain components with high heat dissipation characteristics, such as lasers, radars, millimeter-wave (MMW) imagers, light detection and ranging (LIDAR) imagers, mine-detection sensors, and/or inertial measurement units (IMUs).

SUMMARY

The present teachings provide systems, including apparatus and methods, for driving airflow along a surface of a gimbal, thereby cooling the system and potentially allowing operation at higher ambient temperatures.

DEFINITIONS

Figure 1:
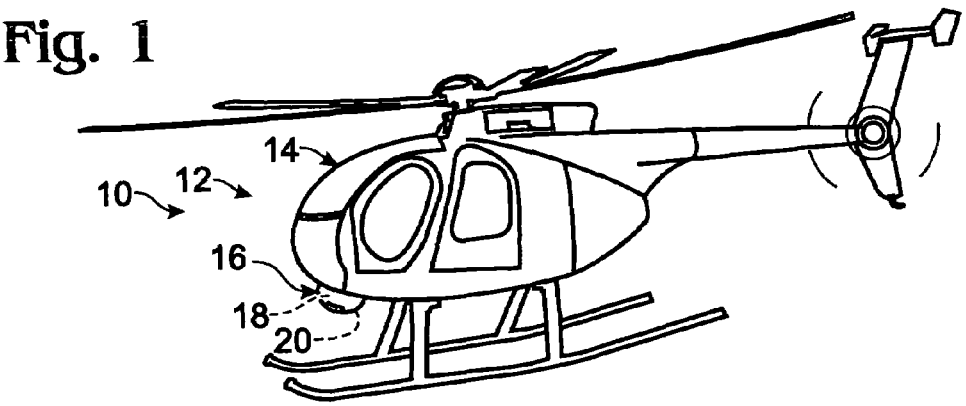
FIG. 1 is a view of an exemplary gimbal system including a support platform (i.e., a helicopter) and a gimbal apparatus with a payload and a fan that cools the payload, in accordance with aspects of the present teachings.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) midwave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, alternatively or additionally may be termed millimeter-wave (MMV) wavelengths.

DETAILED DESCRIPTION

The present teachings provide a system, including apparatus and methods, for driving airflow along a surface of a gimbal, thereby cooling any associated payload. The gimbals may include a first (e.g., outer) gimbal, and a second (e.g., inner) gimbal pivotally coupled to and carried by the first gimbal and enclosing the payload. The apparatus also may include a fan that drives air through the gimbal system. The fan may be mounted in and/or on the first gimbal and may be positioned to drive air along a surface of the gimbals, such as along the outer surface of the second gimbal. For example, the fan may force air through a gap formed between first and second gimbals, to remove heat from the second gimbal and its enclosed payload via the gap. The gap and/or the fan duct associated with the fan may be engineered to increase or maximize the cooling effect, for example, by creating a Venturi effect. The fan may be disposed at least substantially within the first gimbal, such as inside a channel formed in the first gimbal, or may be mounted outside the first gimbal, for example, in a "backpack" arrangement. In some embodiments, operation of the fan may be based on a measured temperature of the gimbal system, for example, a temperature measured in, on, and/or about the second gimbal, to provide closed loop thermal control of a gimbal apparatus.

The gimbal system of the present teachings may offer substantial advantages. For example, the gimbal system may reduce the tendency of a payload to overheat, may offer improved thermal regulation of a vehicle-mounted payload both when the vehicle is moving and stationary, and/or may provide a lower cost solution to thermal regulation of a sealed payload, among others.

Further aspects of the present teachings are described in the following sections, including (I) overview of exemplary gimbal systems, (II) gimbal apparatus, (III) payloads, (IV) fans and thermal regulation systems, (V) support platforms, and (VI) example.

I. Overview of Exemplary Gimbal Systems

FIG. 1 shows an exemplary gimbal system 10. The system may include a support platform 12 (e.g., a helicopter 14) and a gimbal apparatus 16 mounted on the support platform. The gimbal apparatus may be used to mount a payload 18, such as a camera, that is aimed by the gimbal apparatus. In particular, the gimbal apparatus may aim the camera by controlled pivotal movement of constituent gimbals of the gimbal apparatus relative to the helicopter. For example, the camera orientation may be adjusted horizontally and vertically via the gimbals without changing the orientation of the helicopter. Accordingly, the gimbal apparatus may allow one or more fixed and/or moving objects/scenes to be detected over time from a fixed and/or moving support platform. The gimbal apparatus also may include a fan 20 for cooling the payload, gimbal(s), and/or other system components.

Figure 2:
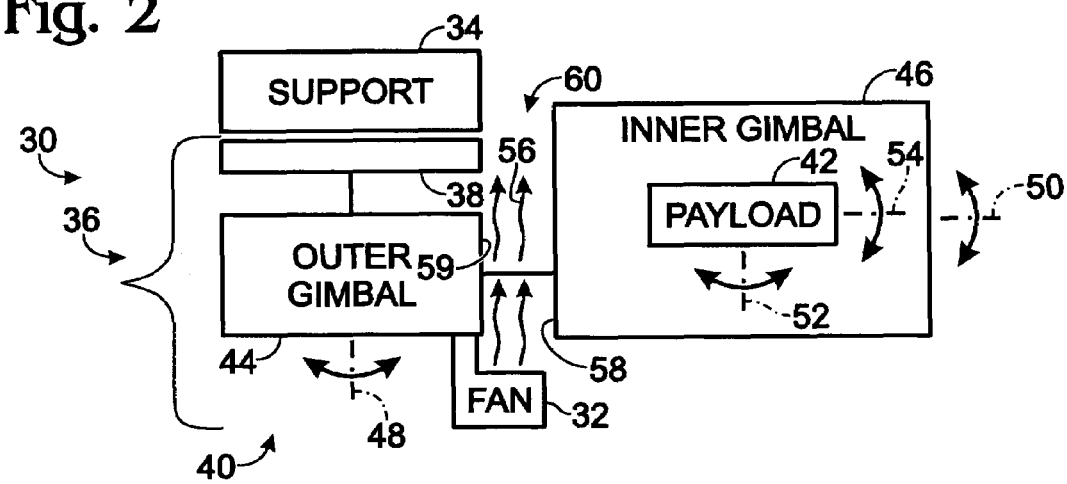
FIG. 2 is a schematic view of another exemplary gimbal system with a fan for cooling a payload, in accordance with aspects of the present teachings.

FIG. 2 shows a schematic view of another exemplary gimbal system 30 with a fan 32 for payload cooling. System 30 may include a support or support platform 34 and a gimbal apparatus 36 attached to the support via a gimbal mount 38.

The gimbal apparatus may include a gimbal assembly 40 and a payload 42 aimed by the gimbal assembly. The gimbal assembly may include, among others, an outer gimbal 44 and an inner gimbal 46. The gimbal assembly may be pivotably coupled to the gimbal mount via outer gimbal 44, for pivotal movement of the entire assembly (and the outer gimbal) about a first axis 48 (e.g., a generally vertical axis). The inner gimbal may be pivotably coupled to the gimbal mount through the outer gimbal, such that the outer gimbal carries the inner gimbal, for pivotal movement about a second axis 50 (e.g., a generally horizontal axis) that is nonparallel to the first axis. Payload 42 may be attached to the gimbal mount via the inner gimbal. Accordingly, pivotal movement of the outer gimbal and/or the inner gimbal may aim the payload in relation to the first and second axes 48, 50. In some embodiments, the payload may be coupled pivotably to the inner gimbal via one or more additional gimbals that pivot about one or more additional axes 52, 54. For example, controlled pivotal movement of the outer and inner gimbals may provide coarser adjustments to the orientation of the payload, and controlled pivotal movement of the additional gimbal(s) may provide finer adjustments to the orientation (or vice versa).

Fan 32 may influence the temperature of the inner gimbal (and payload) by driving air, indicated at 56. The air may be driven along a surface of the outer and inner gimbals, for example, along an outer surface 58 of the inner gimbal (and/or along an inner surface 59 of the outer gimbal, among others).

In some examples, the fan may force air through a gap 60 formed by juxtaposition of the inner and outer gimbals. The fan may be attached to any suitable component of the gimbal apparatus, such as the gimbal mount, the outer gimbal, the inner gimbal, and/or the payload. However, in exemplary embodiments, the fan is mounted to (in and/or on) the outer gimbal, such that the outer gimbal carries the fan as the outer gimbal pivots.

Figure 3:
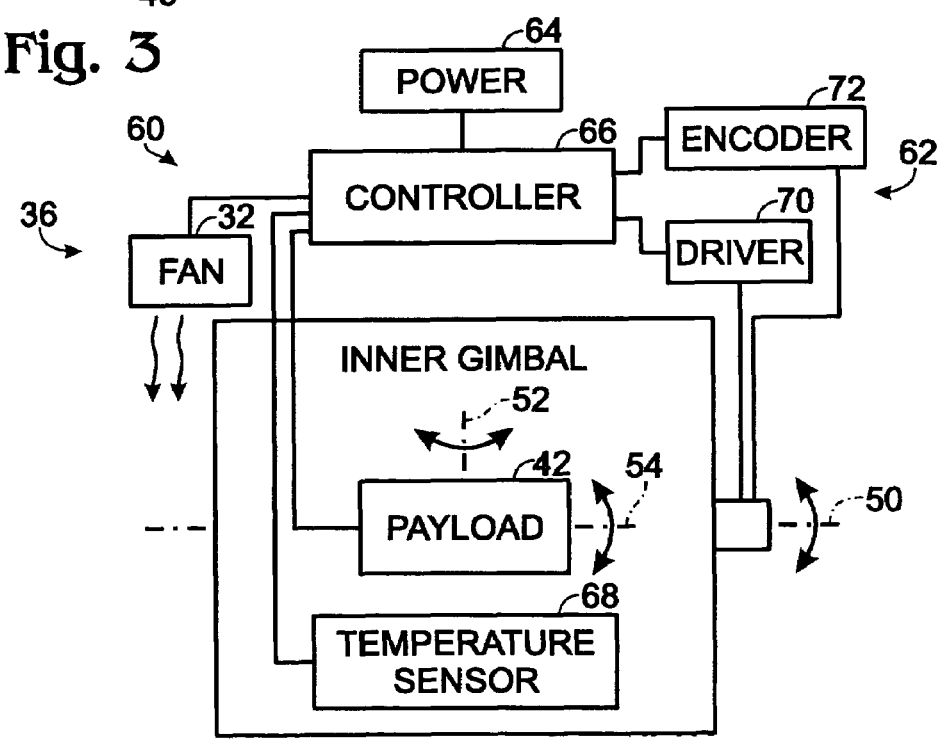
FIG. 3 is a schematic view of selected components of a gimbal apparatus of the gimbal system of FIG. 2.

FIG. 3 shows selected components of gimbal apparatus 36. To simplify the presentation, the outer gimbal and gimbal mount are not shown in FIG. 3. The gimbal apparatus may include a thermal regulation system 60, a position control system 62, and a power supply 64 to provide power to these systems.

Thermal regulation system 60 may operate to provide feedback-regulated control of temperature within the gimbal apparatus. Accordingly, the thermal regulation system may be arranged to function as a closed loop. The thermal regulation system may include a controller 66 operatively coupled to fan 32 and a thermal sensor 68. A thermal aspect of the gimbal apparatus (e.g., a temperature in, on, or about the inner gimbal) may be measured by the thermal sensor and communicated to the controller as a measured signal(s). Based on this measured signal(s), the controller may send a control signal(s) to the fan, to control operation of the fan, for example, turning the fan on, off, or adjusting its speed, among others. The thermal consequences, if any, of this fan control then may be measured with the thermal sensor, to provide feedback to the controller about the fan control, thereby closing the control loop.

Position control system 62 may operate to provide controlled positioning of the payload. The position control system may include controller 66 (or a distinct controller), a driver(s) 70 (e.g., a driver for each gimbal), and an encoder(s) 72 (e.g., an encoder for each gimbal). The driver(s) may drive pivotal movement of each gimbal under the control of the controller. The encoder(s) may measure the position of the gimbal before, during, and/or after movement of each gimbal by the driver(s), to provide feedback information to the controller for further operation of the driver(s) and/or to allow the current position of a gimbal to be recorded and/or reported. The position control system further may include one or more gyroscopes to stabilize the position of the gimbals and/or the payload.

Power supply 64 may include any mechanism for supplying power, such as electrical power, to the thermal regulation system and/or position control system. Suitable power supplies may generate, condition, and/or deliver power, including AC and/or DC power, in continuous and/or pulsed modes. Exemplary power supplies may include batteries, AC-to-DC converters, DC-to-AC converters, and so on.

II. Gimbal Apparatus

Gimbal apparatus, as used herein, are any device-mounting mechanisms that can rotate a mounted device (generally termed a payload) about at least two nonparallel (e.g., perpendicular) axes, thus providing angular movement of the payload in at least two directions. In some embodiments, gimbal apparatus may allow the payload to be oriented generally side to side (in a horizontal direction—azimuthally) and generally up and down (in a vertical direction—elevationally). A gimbal apparatus may include at least two constituent gimbals that can rotate relative to one another and relative to a support platform (such as a vehicle to which the gimbal apparatus is mounted). A gimbal apparatus may include a gimbal mount, a gimbal assembly, and/or a position control system, among others.

A gimbal mount, as used herein, is any structure to which a gimbal assembly is pivotally coupled. The gimbal mount thus may be attached directly to at least one gimbal and attached indirectly to one or more additional gimbals. The gimbal mount, in turn, may be attached to a support platform (see Section V) or may rest upon a support platform without attachment thereto. The gimbal mount may be mounted to a support platform via any suitable mechanism, with any suitable orientation. For example, when used with a vehicle, a gimbal mount (and/or the corresponding gimbal apparatus) may be bottom-mounted, side-mounted, top-mounted, front-mounted, rear-mounted, externally mounted, internally mounted, and/or so on. Moreover, such mounting may be static or dynamic, for example, involving additional gimbal (s) to provide dynamic mounting. The gimbal mount may carry and/or contain any suitable components of a gimbal apparatus, including a controller(s), power supply, user controls, electrical conduits or other electrical circuitry, a fan(s), and/or the like.

A gimbal assembly, as used herein, is a hierarchical arrangement of two or more pivotable members (gimbals). A gimbal assembly thus may include a higher-order gimbal pivotally coupled directly to a gimbal mount. The gimbal assembly also may include a lower-order gimbal pivotally coupled directly to the higher-order gimbal and indirectly to the gimbal mount, such that the lower-order gimbal is carried by the higher-order gimbal. As a result, pivotal motion of the higher-order gimbal in relation to the gimbal mount results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including two axes, three axes, four axes, five axes, six axes, or even more than six axes. In some embodiments, the different axes of rotation may be collinear or coplanar. The axes of rotation typically are either perpendicular to one another or parallel to (including collinear with) one another, although this is not required. In some embodiments, parallel axes, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the gimbal mount) and having a relatively smaller range of angular motion (such as less than about 90 degrees).

Each gimbal of a gimbal assembly may be driven controllably by a driver. An exemplary driver that may be suitable is described in U.S. patent application Ser. No. 10/956,738, filed Oct. 1, 2004, which is incorporated herein by reference.

III. Payloads

The gimbal system of the present teachings may pivotally mount a payload to a gimbal mount via a gimbal assembly. The payload thus may be aimed relative to the gimbal mount (and relative to a support platform with which the gimbal mount is associated) by controlled motion of gimbals within the gimbal assembly.

A payload, as used herein, is any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), and/or the like. An emitter generally comprises any mechanism for emitting a suitable or desired signal, such as electromagnetic radiation (e.g., via a laser), sonic energy, and/or the like. The payload generally is in communication with a controller that sends signals to and/or receives signals from the payload. The payload may be coupled (generally via a controller) to a display such that signals from payload may be formatted into a visual form for viewing on the display. The present teachings may be especially useful when the payload contains high heat-emitting components, such as lasers, radars, millimeter-wave (MMW) images, light detection and ranging (LIDAR) imagers, mine-detection sensors, and/or inertial measurement units (IMUs).

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from the reflection of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CCDs), charge-injection devices (CIDs), complementary metal-oxide semiconductor (CMOS) arrays, photodiode arrays, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others.

The imaging system may also contain gyroscopes and/or other elements arranged to form an inertial measurement unit (IMU) on the optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present teachings may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example by superimposing infrared images of hot spots, runway lights, persons, and/or the like on visible images.

The payload alternatively, or in addition, may include non-imaging systems, such as laser rangefinders, laser designators, laser communication devices, polorarimeters, hyperspectral sensors, and/or the like.

Further aspects of imaging systems that may be suitable for the gimbal system of the present teachings are described in the following patent applications, which are incorporated herein by reference: U.S. Provisional Patent Application Ser. No. 60/696,306, filed Jul. 1, 2005; and U.S. patent application Ser. No. 11/207,536, filed Aug. 19, 2005.

IV. Fans and Thermal Regulation Systems

The gimbal system of the present teachings may include any suitable device and/or arrangement of devices to influence the temperature of any suitable portion of a gimbal apparatus. The device(s) generally includes at least one fan and may include one or more sensors or controllers operatively coupled to the fan.

A fan, as used herein, is any device that drives the flow of air. A fan thus may include any air-driving structure that promotes formation of an air current. The air-driving structure may be formed, for example, by a blade(s), a vane(s), a propeller, an impeller, and/or the like. The fan may drive air in any suitable direction between inflow and outflow paths, including axially, radially, orthogonally, transversely, converging, diverging, and/or the like. Accordingly, exemplary fans that may be suitable include axial fans (e.g., propeller, tube-axial, and/or vane-axial fans, among others), centrifugal fans, radial fans, cross-flow fans, positive-displacement blowers, helical screw blowers, single-stage and multi-stage centrifugal blowers, regenerative blowers, liquid ring blowers, and/or the like.

A fan generally also includes a motor to drive movement of the air-driving structure of the fan. The motor may be operated in one direction only or reversibly, generally to reverse the flow of air. Any suitable motor may be used, including a DC, AC, or universal (AC or DC) motor. The motor may be coupled directly to the air-driving structure and/or indirectly via a belt(s), a chain(s), a gear(s), a screw(s), and/or via induction, among others.

A fan also may include a mounting structure, such as a fan housing. The fan housing may hold the air-driving structure, the motor, and/or additional fan components. Furthermore, the fan housing may position the fan within a gimbal system, for example, by attachment of the fan housing to a housing structure of the gimbal system. The fan housing may be attached fixedly or pivotally to a housing structure (and/or gimbal) of the gimbal system, such that the position of the fan housing is static or dynamic relative to the housing structure/gimbal. The fan housing (and/or the housing structure/gimbal) also may provide walls that direct airflow in relation to portions of the gimbal system. The walls thus may form a tunnel, a vent(s), and/or a flap(s) for defining a flow path(s) of air from and/or to the air-driving structure of the fan.

The fan may have any suitable positional relationship to a gimbal apparatus and may correspond to any number of individual fan units. The fan thus may be attached to a stationary or pivotable portion of the gimbal apparatus, for example, attached to a gimbal mount or to a gimbal (such that the fan pivots with the gimbal). Moreover, the fan may be mounted such that it remains fixed or stationary with respect to one gimbal, and moves with respect to one or more other gimbals. If attached to a gimbal, the fan may be attached to an outer gimbal, to an inner gimbal, and/or the like. In some examples, the fan may be disposed at least substantially inside a gimbal, for example, positioned in a channel defined by the gimbal, or may be disposed outside the gimbal to which the fan is attached. Furthermore, the fan may be a plurality of fans (and/or a plurality of air-driving structures), which may be positioned at about the same height (e.g., side-by-side), at different heights (e.g., above and below one another), and/or the like. The fan(s) may be positioned towards the front, the back, a side, the top, the middle, and/or the bottom of a gimbal apparatus. With a plurality of fans, the fans may be positioned adjacent one another, or substantially spaced (e.g., opposing one another in and/or on the gimbal apparatus).

The fan(s) may be operated in any suitable modes. The fan may move air along a path in one direction (e.g., front to back or back to front) or may be reversible to move air controllably in either opposing direction. In addition, the fan may have a single speed or may have a variable speed, for example, such that the fan can move air faster or slower as appropriate. Furthermore, in some examples, the fan may be oriented controllably.

Any suitable aspects of fan operation may be controlled automatically and/or via operator input. These aspects may include fan actuation (on/off), speed, direction (forward or reverse), disposition (e.g., angular and/or translational disposition), the number of fans actuated, and/or the like. In some embodiments, the controller may control fan operation based on sensed/signaled aspects of the gimbal system. These sensed/signaled aspects may include a sensed or signaled temperature (in, on, and/or about the gimbal apparatus), air velocity, actuation state of the gimbal system's payload (e.g., on or off), movement of the gimbals of the gimbal system, orientation of the payload, support platform velocity, and/or the like.

The fan(s) may be operated based on a temperature sensed by a temperature sensor. The temperature sensor may be positioned to sense the temperature of any suitable portion of the gimbal system, including the temperature inside, on, or adjacent a gimbal; the payload temperature; and/or the air temperature outside the gimbal apparatus; among others. Any suitable temperature (thermal) sensor(s) may be included in the gimbal system, including a contact or noncontact device, such as a thermocouple, a thermistor, a radiation thermometer (a pyrometer), a resistance temperature device, a thermal imager, a (liquid in glass) thermometer, and/or the like.

The controller may be configured to operate a feedback loop with the fan and the temperature sensor. Accordingly, the controller may be or include, for example, a PI (proportional, integral) controller, a PID (proportional, integral, derivative) controller, and/or any other suitable feedback-based controller.

The controller may be configured to operate the fans when a high-heat dissipation component of the payload is used, such as a laser.

The controller may be configured to operate the fans when a particular gimbal mode of operation is selected, such as "step-stare," in which a detailed wide-field image is created by tiling together, into a mosaic, a series of high-resolution narrow-field images.

V. Support Platforms

The gimbal system of the present teachings may include a gimbal apparatus supported by a support platform. A support platform, as used herein, generally refers to any mechanism for holding, bearing, and/or presenting a gimbal apparatus and its payload. The support platform may be moving, movable but stationary, or fixed in relation to the earth, and may be disposed on the ground, in the air or space, or on and/or in the water, among others. In any case, the support platform may be selected to complement the function of the gimbal apparatus and particularly its payload.

The support platform may be movable, such as a vehicle. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.).

The support platform may be fixed in position. Exemplary fixed support platforms may include a building, an observation tower, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, and/or surveillance, among others.

VI. Example

Figure 4:
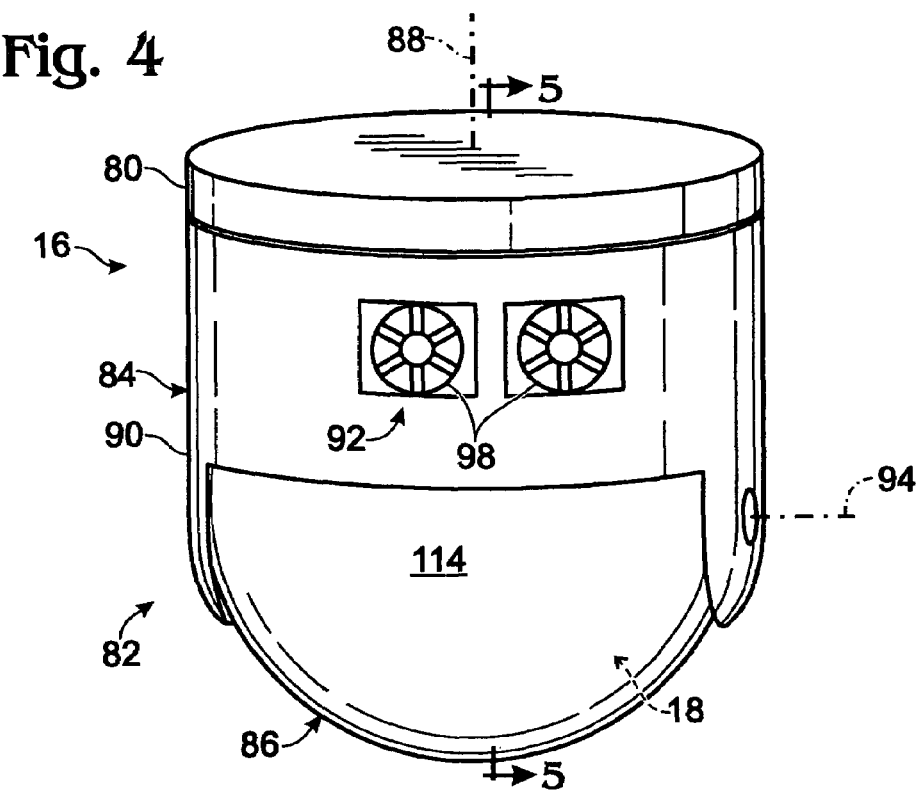
FIG. 4 is a rear view of a gimbal apparatus of the gimbal system of FIG. 1, showing a pair of fans mounted within an outer gimbal of the gimbal apparatus.
Figure 5:
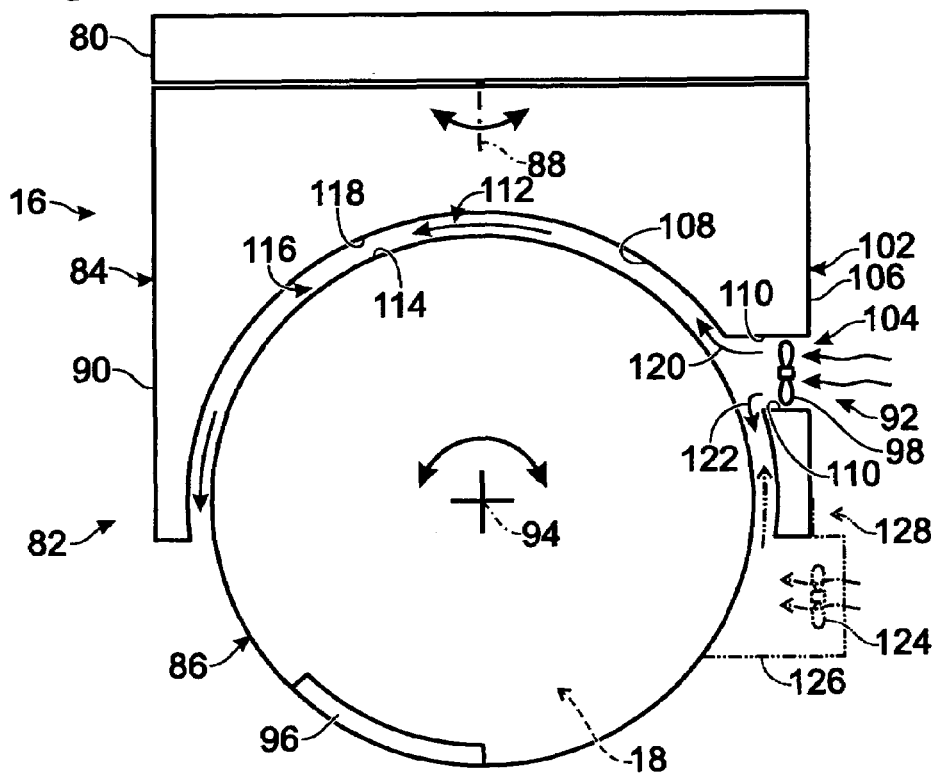
FIG. 5 is a somewhat schematic sectional view of the gimbal apparatus of FIG. 4, taken generally along line 5-5 of FIG. 4.

The following example describes selected aspects of an exemplary gimbal apparatus 16 with driven airflow; see FIGS. 4 and 5. Additional aspects of gimbal apparatus 16 are described above in relation to FIG. 1. This example is intended for illustration and should not be interpreted as limiting the entire scope of the present teachings.

FIG. 4 show a rear view of gimbal apparatus 16, and FIG. 5 shows a somewhat schematic sectional view of the gimbal apparatus of FIG. 4, taken generally along line 5-5 of FIG. 4. The gimbal apparatus may include a support structure, such as a gimbal mount 80, and a gimbal assembly 82 that pivots controllably in relation to the gimbal mount. The gimbal mount may include a bracket(s) and/or other attachment structure that facilitates affixing the gimbal mount to a support platform.

The gimbal assembly may include an outer gimbal 84 and an inner gimbal 86, each of which is capable of controlled pivotal movement in relation to the gimbal mount. In some embodiments, the gimbal assembly may include additional gimbals, for example, disposed within the inner gimbal.

The outer gimbal may be coupled more directly to the gimbal mount for pivotal movement about a nominal vertical axis 88 (for azimuthal positioning; see FIG. 5), if the gimbal mount is attached to a generally horizontal surface of a support platform. The outer gimbal may provide a housing 90. The housing may form at least a portion of an exterior surface of the gimbal apparatus. Alternatively, or in addition, the housing may house at least a portion of the inner gimbal and/or at least a portion of a thermal control system 92.

The inner gimbal may be coupled to the gimbal mount via the outer gimbal. Accordingly, pivotal movement of the outer gimbal about pivot axis 88 may carry the inner gimbal along with the outer gimbal. The inner gimbal may be pivotable about a nominally horizontal axis 94 (for elevational positioning; see FIG. 5), if the gimbal mount is attached to a generally horizontal surface of a support platform. Accordingly, vertical and horizontal pivot axes 88, 94 may be orthogonal to one another.

The inner gimbal may have any suitable structure. For example, the inner gimbal may have a substantially spherical shape. Furthermore, the inner gimbal may be at least substantially sealed hermetically to protect payload 18 contained within the inner gimbal. In some embodiments, payload 18 may be an imaging system, and the inner gimbal may include an optical window 96 that is substantially transmissive for radiation sensed by the imaging system (see FIG. 5).

Thermal control system 92 may include one or more fans 98 attached to the outer gimbal (see FIG. 4). In the present illustration, the outer gimbal carries two fans. Each fan may be disposed inside an exterior envelope 102 of the outer gimbal, for example, within an opening or fan duct 104 formed in the outer gimbal (see FIG. 5). Opening 104 may extend between an outer wall 106 and an inner wall 108 of the outer gimbal. Furthermore, opening 104 may be a channel or tunnel including side walls 110 extending between the outer and inner walls of the gimbal. The tunnel may direct air to and/or from the fan.

Fan 98 may be positioned to drive air, shown at 112, along an outer surface 114 of the inner gimbal (see FIG. 5). In particular, the fan may drive or force air along and through a gap 116 formed between the inner and outer gimbals. The gap may be created by an inner surface 118 of the outer gimbal that is complementary to outer surface 114 of the inner gimbal. The fan may drive airflow such that air is pulled to the fan from external the gimbal apparatus and then pushed through the gap toward the opposing side of the inner gimbal and gimbal apparatus, as in the present illustration. Alternatively, the fan may be reversed such that air is pulled to the fan from the gap and from an opposing side of the inner gimbal and gimbal apparatus, and then is pushed away from the gimbal apparatus through opening 104. In any case, tunnel 110 may be shaped such that airflow from/to the fan from along the inner gimbal surface preferentially follows upper path 120 rather than lower path 122. In particular, airflow along the upper path may be preferred because the upper path may trap more heat. However, use of the lower path to direct airflow also may accelerate heat exchange.

The fan duct and gap may have any suitable shapes and dimensions. For example, the fan duct may be substantially cylindrical, and the gap may be substantially semi-spherical, as shown here. The fan duct and/or gap may be designed, as here, to create a Venturi effect for more efficient air flow and cooling. For example, these components may be designed so that air flows faster by, and is exchanged more rapidly over, hotter portions of the gimbal (e.g., adjacent heat-dissipating components). This may be accomplished, according to the continuity equation, by reducing the cross-sectional area of the fan duct and/or gap in such areas. Alternatively, or in addition, the fan duct and/or gap may be designed so that airflow preferentially is directed at hotter portions of the gimbal. In some embodiments, heat generating components may be positioned preferentially near the fan or fan duct, to receive cooler air and/or greater airflow, and/or near the output so that collected heat is more quickly routed out of the system. The gap, particularly any specially narrowed or widened portions, may at least partially occupy portions of the gimbal system that are relatively stationary and/or relatively movable relative to the fan, including portions between a first relatively stationary portion and a second relatively movable portion. The system may exploit the natural space between surfaces to create and/or maintain a high-velocity air flow through a natural plenum in the gimbal system and along one or more surfaces of the gimbal system.

The gimbal system as a whole may be designed so that, when the system is moving, air outside the system flows relatively slower near where air is inputted (e.g., near the fan if it is blowing air into the system) and faster near where air is outputted, so that there is a pressure gradient between the input and output that further biases airflow through the system.

The fan may be disposed on the rearward side of the outer gimbal. This position may be more protected from potentially damaging airflow produced by forward movement if the support platform is a vehicle.

A fan 124 also or alternatively may be positioned outside the outer gimbal, as shown in phantom outline in FIG. 5. For example, fan 124 and its housing 126 may be attached externally to the outer gimbal, shown at 128, to provide a "backpack" configuration for the fan.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A gimbal system, comprising:
   a gimbal apparatus including a payload and also including a gimbal mount supporting a first gimbal and a second gimbal, the first gimbal being coupled pivotally to the gimbal mount and the second gimbal being coupled pivotally to and supported by the first gimbal and also being coupled to and supporting the payload such that the gimbal apparatus orients the payload by pivotal movement of the first and second gimbals relative to the gimbal mount about at least two nonparallel axes; and
   a fan mounted to the first gimbal.

2. The gimbal system of claim 1, wherein the payload detects electromagnetic radiation.

3. The gimbal system of claim 2, wherein the payload includes a detection portion of an imaging system, and wherein the detection portion detects visible radiation, infrared radiation, or both.

4. The gimbal system of claim 1, wherein the payload includes a laser.

5. The gimbal system of claim 1, wherein the gimbal apparatus further includes at least one other gimbal, wherein the payload is supported by the at least one other gimbal and is pivotally coupled to the second gimbal via the at least one other gimbal.

6. The gimbal system of claim 1, wherein the first gimbal and the second gimbal are separated by a gap, and wherein the fan is positioned to drive air through the gap.

7. The gimbal system of claim 6, wherein the gap has a substantially semi-spherical shape.

8. The gimbal system of claim 6, wherein portions of the gap have a smaller cross-sectional area than other portions of the gap, increasing air flow along at least one relatively hotter portion of a surface of the first and second gimbals.

9. The gimbal system of claim 1, wherein the payload is enclosed by the second gimbal.

10. The gimbal system of claim 9, wherein the payload is hermetically sealed inside the second gimbal, and wherein the second gimbal is at least substantially spherical.

11. The gimbal system of claim 1, further comprising a controller that operates the fan according to a temperature measured by a temperature sensor operatively coupled to the controller.

12. The gimbal system of claim 11, wherein the second gimbal encloses the payload, and wherein the temperature sensor measures a temperature associated with the second gimbal.

13. The gimbal system of claim 1, wherein the first gimbal is an outer gimbal, wherein the second gimbal is an inner gimbal, and wherein the outer gimbal defines a channel in which the fan is disposed.

14. The gimbal system of claim 1, further comprising:
one or more drivers configured to drive pivotal movement of the first and second gimbals; and
a controller configured to control operation of the drivers.

15. The gimbal system of claim 1, wherein the gimbal apparatus and the fan are configured such that operation of the fan drives airflow through a gap disposed between the first and second gimbals.

16. A method of cooling a gimbal system that includes a gimbal apparatus including a payload and also including a gimbal mount supporting a first gimbal and a second gimbal, the first gimbal being coupled pivotally to the gimbal mount and the second gimbal being coupled pivotally to and supported by the first gimbal and also being coupled to and supporting the payload such that the gimbal apparatus orients the payload by pivotal movement of the first and second gimbals relative to the gimbal mount about at least two nonparallel axes, the method comprising:
operating a fan to drive airflow through a gap disposed between the first and second gimbals.

17. The method of claim 16, further comprising a step of sensing a temperature associated with the second gimbal, wherein the step of operating a fan includes a step of operating a fan based on the step of sensing a temperature.

18. A gimbal system, comprising:
a gimbal apparatus including a payload with at least one detector and also including a gimbal mount supporting a first gimbal and a second gimbal, the first gimbal being coupled pivotally to the gimbal mount and the second gimbal being coupled pivotally to and supported by the first gimbal and also being coupled to and supporting the payload such that the gimbal apparatus orients the payload by pivotal movement of the first and second gimbals relative to the gimbal mount about at least two nonparallel axes;
one or more drivers configured to drive pivotal movement of the first and second gimbals;
a controller configured to control operation of the drivers; and
a fan attached to and supported by the gimbal apparatus,
wherein the fan and the first and second gimbals are configured such that operation of the fan drives airflow through a gap disposed between the first and second gimbals.

19. The gimbal system of claim 18, wherein the payload detects both visible radiation and infrared radiation.

20. The gimbal system of claim 18, wherein the payload includes a laser.

21. The gimbal system of claim 18, wherein the first gimbal has an outer wall and an inner wall, and wherein the fan is disposed generally between the outer wall and the inner wall.

22. The gimbal system of claim 18, wherein the fan is mounted to the first gimbal.

23. The gimbal system of claim 22, wherein the first gimbal defines a tunnel, and wherein the fan is disposed in the tunnel.

24. The gimbal system of claim 22, wherein the fan is disposed outside the first gimbal.

25. The gimbal system of claim 18, wherein the fan and first and second gimbals are configured such that air from outside the gimbal apparatus flows through the gap.

* * * * *